United States Patent [19]
Laurien et al.

[11] Patent Number: 5,244,063
[45] Date of Patent: Sep. 14, 1993

[54] CONTROLLABLE OR REGULATABLE HYDRAULIC SHOCK ABSORBER

[75] Inventors: Dietrich Laurien, Reichenbach/Fils; Helmut Luncz, Korntal, both of Fed. Rep. of Germany

[73] Assignee: Mercedes-Benz AG, Fed. Rep. of Germany

[21] Appl. No.: 769,375

[22] Filed: Oct. 1, 1991

[30] Foreign Application Priority Data

Oct. 19, 1990 [DE] Fed. Rep. of Germany ....... 4033190

[51] Int. Cl.⁵ .............................................. F16F 9/46
[52] U.S. Cl. .................... 188/299; 188/319; 188/322.15
[58] Field of Search ............... 188/280, 282, 285, 299, 188/322.15, 275, 319; 251/30.01, 30.04, 129.09, 129.1

[56] References Cited

U.S. PATENT DOCUMENTS

| | | | |
|---|---|---|---|
| 4,060,155 | 11/1977 | Duckett | 188/282 |
| 4,655,440 | 4/1987 | Eckert | 188/299 |
| 4,690,371 | 9/1987 | Bosley et al. | 251/129.1 |
| 4,732,408 | 3/1988 | Ohlin | 188/322.15 |
| 4,756,286 | 7/1988 | Wietschorke et al. | 251/129.09 |
| 4,880,086 | 11/1989 | Knecht et al. | 188/299 |
| 4,946,009 | 8/1990 | Knutson | 188/299 |
| 5,064,032 | 11/1991 | Ashiba | 188/299 |
| 5,078,240 | 1/1992 | Ackermann et al. | 188/322.15 |
| 5,085,299 | 2/1992 | Spiess et al. | 188/319 |
| 5,094,321 | 3/1992 | Neumann | 188/285 |

FOREIGN PATENT DOCUMENTS

| | | |
|---|---|---|
| 0186167 | 7/1986 | European Pat. Off. . |
| 0330634 | 8/1989 | European Pat. Off. . |
| 2536578 | 2/1976 | Fed. Rep. of Germany . |
| 8610374 | 12/1987 | Fed. Rep. of Germany . |
| 3635894 | 5/1988 | Fed. Rep. of Germany . |
| 3835705 | 4/1990 | Fed. Rep. of Germany . |
| 3917064 | 11/1990 | Fed. Rep. of Germany ...... 188/299 |
| 3922891 | 1/1991 | Fed. Rep. of Germany ...... 188/299 |
| 3924168 | 1/1991 | Fed. Rep. of Germany ...... 188/319 |
| 3-217311 | 9/1991 | Japan .................. 188/319 |
| 2231122 | 11/1990 | United Kingdom . |

Primary Examiner—Robert J. Oberleitner
Assistant Examiner—Kevin D. Rutherford
Attorney, Agent, or Firm—Evenson, McKeown, Edwards, & Lenahan

[57] ABSTRACT

A controllable or regulatable hydraulic shock absorber has a damping-control valve designed as a force-proportional valve and has a closing force variable directly or indirectly via a proportional magnet. The damping resistance brought about by the damping-control valve is consequently very largely independent of the stroke speed of the shock-absorber piston.

19 Claims, 4 Drawing Sheets

CONTROLLABLE OR REGULATABLE HYDRAULIC SHOCK ABSORBER

BACKGROUND AND SUMMARY OF THE INVENTION

The invention relates to a controllable or regulatable hydraulic shock absorber and, more particularly, to a controllable or regulatable hydraulic shock absorber having two working chambers The two working chambers are divided off from one another by a piston or a displacer. The two working chambers are connected to one another, for the exchange of hydraulic medium during stroke movements of the piston or displacer, via a damping-control valve arrangement. The damping-control valve arrangement includes a closing member stressed into the closing position by a spring arrangement which opens an orifice cross-section which depends on the pressure difference between the working chambers and on the force of an electromagnet arrangement controlling the closing member and having an armature arrangement located between the closing member and the spring arrangement.

At the same time, the electromagnet arrangement is preferably designed as a proportional magnet, so that the adjusting force essentially depends only on the intensity of the electrical current passing through the magnet. Moreover, the damping-control valve arrangement is preferably designed as a force-proportional valve, so that the damping force is essentially independent of the stroke speed of the piston or displacer.

A hydraulic shock absorber of the above-mentioned type is described in German Patent Document 3,835,705.

In such a shock absorber, it is advantageous that operability is ensured even in the event of a failure of the electromagnet arrangement. This is because there still remains a minimum damping force which is determined by the dimensioning of the spring arrangement.

Furthermore, it is known from German Patent Document 3,835,705, by means of the electromagnet arrangement, to control the closing force of a pilot control valve which then itself influences a damping-control valve. Large variations of the damping force can be achieved in this way with comparatively small electromagnet arrangements.

In a shock absorber known from German Utility Model 86 10 374, the closing member of a damping-control valve constitutes the armature of an electromagnet The electromagnet is designed such that the forces generated when current passes through the electromagnet seek to urge the closing member in the opening direction counter to the force of a spring arrangement. Here too, the shock absorber remains operational in the event of a failure of the electromagnet In such an instance, the damping behavior is simply determined solely by the characteristic of the spring arrangement.

German Patent Document 2,536,578 and EP-A-0,330,634 describe further controllable or regulatable hydraulic shock absorbers. In these shock absorbers, the orifice cross-section, opened by a damping-control valve in a line between the two working chambers, is likewise dependent on the pressure difference between the two working chambers. Here too, the proportionality factor between the orifice cross-section and the pressure difference is influenced by an electromagnet arrangement. At the same time, the electromagnet arrangement controls in each case a pilot control valve, the setting of which can then indirectly influence the above-mentioned proportionality factor According to German Patent Document 2,536,578, the electromagnet drive of the pilot control valve is self-locking, such that, in the event of a failure of the electromagnet arrangement, the particular setting of the pilot control valve last selected is maintained.

According to EP-A-0,330,634, if the electromagnet arrangement fails the pilot control valve assumes one end position, in which the shock absorber has an especially week action.

In the above-described shock absorbers, if the electromagnet arrangement fails there is either an especially hard or an especially weak damping. Correspondingly, in emergency operation, that is to say in the event of a failure of the electromagnet arrangement, either marked loss of comfort because of especially hard damping or loss of safety because of especially weak damping have to be taken into account.

German Patent Document 3,635,894 makes known a further controllable or regulatable hydraulic shock absorber, in which there is an armature arrangement. The armature arrangement, depending on the direction in which current passes through the electromagnet arrangement, displaces a closing member in the closing direction or in the opening direction, so that the damping resistance either increases or decreases. The closing member is designed as a rotary slide, and therefore the pressure differences between the working chambers of the shock absorber exert no adjusting forces on the closing member. The respective orifice cross-section opened by the closing member between the working chambers of the shock absorber therefore depends solely on the intensity and direction of the electrical current passing through the electromagnet arrangement. A force-proportional opening behavior cannot be obtained in this way.

Furthermore, in the shock absorber of German Patent Document 3,635,894, when electrical current does not pass through the electromagnet arrangement the closing member is held by springs in a middle position, in which the closing member opens a medium orifice cross-section between the working chambers of the shock absorber.

There is therefore needed a shock absorber of the above-mentioned type which is distinguished by the best possible emergency running properties in the event of a failure of the electromagnet arrangement.

This need is met, according to the present invention, in that the armature arrangement can be loaded in the direction to strengthen and/or weaken the closing force of the closing member, depending on the passage of current through the electromagnet arrangement.

The present invention ensures, by an appropriate dimensioning of the spring arrangement urging the closing member into the closing position, a basic damping which remains effective in the event of a failure of the electromagnet arrangement and which is dimensioned as would be desirable or ideal in an arrangement of hydraulic shock absorbers which are not controllable or regulatable. Because a variation of the closing force both with the effect of a strengthening and with the effect of a weakening is now possible by means of the electromagnet arrangement, when the electromagnet arrangement works correctly the damping best suited to the particular operating circumstances can be achieved.

It is advantageous, furthermore, that the relative speed between the sprung mass or vehicle body and non-sprung mass or wheels need not be taken into account in the regulation of the damping force. This is because the parameter is at most of subsidiary importance as regards the operating behavior when the features indicated above are present.

According to a first preferred embodiment, there can be provision for the armature arrangement to interact with two magnet coils, the flow of current through one magnet coil bringing about a strengthening of the damping force and the flow of current through the other magnet coil bringing a weakening of the damping force.

It is also possible to design the armature arrangement as a permanent magnet, in which case a strengthening or a weakening of the damping force occurs, depending on the direction in which current flows through an associated magnet coil.

It is expedient, furthermore, to connect the damping-control valve arrangement to non-return valves, in such a way that both in the compression stage and in the extension stage of the shock absorber the exchange of hydraulic medium between the working chambers always takes place via the same damping-control valve and always passes through this in the same direction of flow.

The non-return valves, which can be designed in a basically known way as spring-plate valves, can be dimensioned differently, in such a way that the non-return valves opened in the compression stage have a different throttle resistance than the non-return valves opened in the extension stage. A different basic damping can thus be achieved for the compression stage and the extension stage.

Other objects, advantages and novel features of the present invention will become apparent from the following detailed description of the invention when considered in conjunction with the accompanying drawings

DETAILED DESCRIPTION OF THE DRAWINGS

Figure 1A:
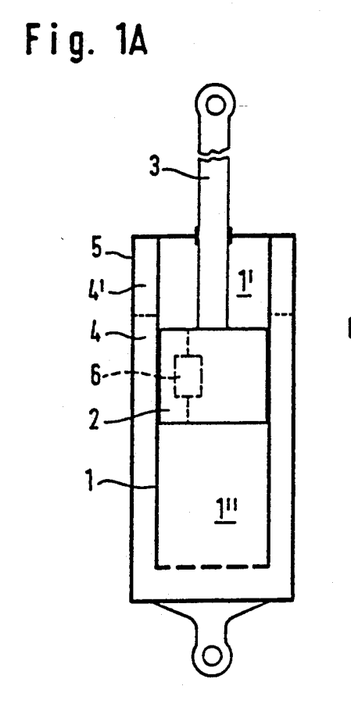
FIGS. 1A and 1B are circuit diagrams of a shock absorber according to the invention.

A hydraulic telescopic shock absorber is shown diagrammatically in portion A of FIG. 1. The shock absorber essentially includes a working cylinder 1 and a piston 2 which separates two chambers 1' and 1" from one another in the working cylinder The piston 2 possesses a piston rod 3 which is arranged on one side and which passes through an orifice sealed off relative to the piston in the upper bottom of the working cylinder 1. Via orifices at the lower end or in the lower bottom of the working cylinder 1, the chamber 1" communicates with an annular space 4 between the working cylinder 1 and an outer cylinder 5 which encases the working cylinder and which is connected firmly to the working cylinder 1.

The chambers 1' and 1" and the region of the annular space 4 (the lower region in the drawing) are filled with a hydraulic medium, while the upper portion 4' of the annular space 4 receives a compressible pneumatic medium.

The chambers 1' and 1" are connected hydraulically to one another via a valve arrangement 6 located in the piston 2 and having a throttle effect, in such a way that, during a stroke movement of the piston 2, hydraulic medium displaced from the particular reducing chamber 1' or 1" can, by overcoming the throttle resistance of the valve arrangement 6, flow over into the other chamber 1" or 1'. Moreover, the compressible pneumatic medium in the portion 4' of the annular space 4 is compressed to a greater or lesser extent, depending on whether the piston rod 3 is pushed more or less far into the working cylinder.

In contrast to the arrangement illustrated, in which the valve arrangement 6 is accommodated in the piston 2, an arrangement on the working cylinder 1 or outer cylinder 5 is also possible. It is important merely that, in all positions of the piston 2, the valve arrangement 6 should connect the chamber 1' of the working cylinder 1 to its chamber 1" or to the hydraulic region of the annular space 4 communicating with chamber 1".

Figure 1B:
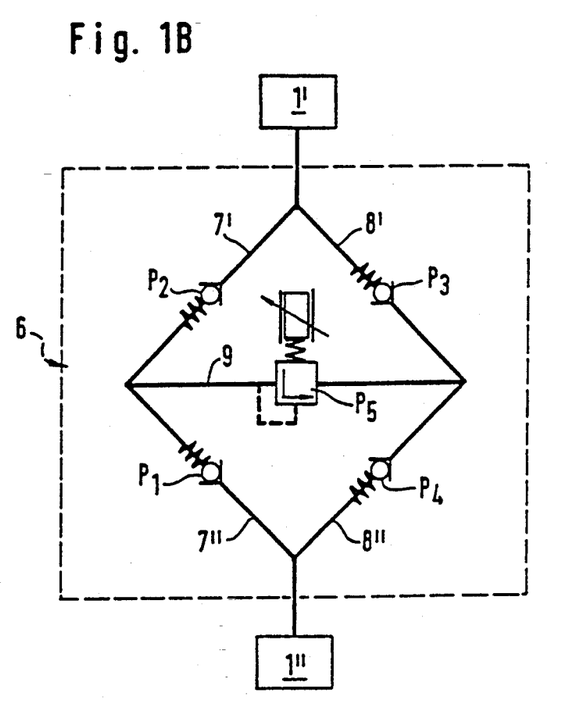

The valve arrangement 6 is shown diagrammatically in portion B of FIG. 1. It essentially includes four non-return valves $P_1$ to $P_4$ and a damping-control valve $P_5$. Thus, the non-return valves $P_1$ and $P_2$ are arranged in a first line connecting the chambers 1' and 1" and having the line branches 7' and 7", specifically in such a way that the non-return valve $P_1$ opens in the case of a direction of flow leading away from the chamber 1", whereas the non-return valve $P_2$ is opened in the case of a direction of flow leading away from the chamber 1'. The non-return valves $P_3$ and $P_4$ are arranged in a second line connecting the chambers 1' and 1" and having the segments 8' and 8", the non-return valve $P_3$ preventing a direction of flow leading away from the chamber 1' and the non-return valve $P_4$ preventing a direction of flow leading away from the chamber 1" in the respective line segments 8' and 8".

The damping-control valve $P_5$ is in a line 9 which is connected on the one hand between the segments 7' and 7" of the first line and on the other hand between the segments 8' and 8" of the second line. The damping valve $P_5$ is so designed and arranged that, in FIG. 1, when there is a sufficient pressure drop between its inlet side and outlet side, the flow can pass through it from left to right.

Now if the piston 2 moves downwards in FIG. 1, hydraulic medium flows out of the chamber 1" via the non-return valve $P_1$, the damping-control valve $P_5$ and the non-return valve $P_3$ into the chamber 1'. When the piston 2 moves upwards in FIG. 1, hydraulic medium flows out of the chamber 1' via the non-return valve $P_2$, the damping-control valve $P_5$ and the non-return valve $P_4$ into the chamber $1''$. Thus, in both stroke directions of the piston 2, the flow always passes through the damping-control valve $P_5$ in the same direction because of the illustrated connection of the non-return valves $P_1$ to $P_4$.

The particular damping resistance opposing the piston stroke is determined respectively by the throttle resistance of the damping-control valve $P_5$ and the throttle resistances of the respective non-return valves $P_1$ and $P_3$ or $P_2$ and $P_4$ through which the flow passes.

As shown further below, the throttle resistance of the damping-control valve $P_5$ can be varied electro-magnetically, specifically both with the effect of a strengthening and with the effect of a weakening of a constructively predetermined basic setting for the throttle resistance.

The respective non-return valves $P_1$ and $P_3$ or $P_2$ and $P_4$ through which the flow passes can have different throttle resistances, so that, even when the damping-control valve $P_5$ is in the basic setting, in general a different damping factor prevails in the extension stage of the shock absorber, that is to say during the upward movement of the piston 2, from that in the compression stage, that is to say during the downward movement of the piston 2 in relation to the working cylinder 1.

The piston 2 and the valve arrangement 6 accommodated in it are now illustrated in FIGS. 2 to 6 especially advantageously from the point of view of construction.

Figure 2:
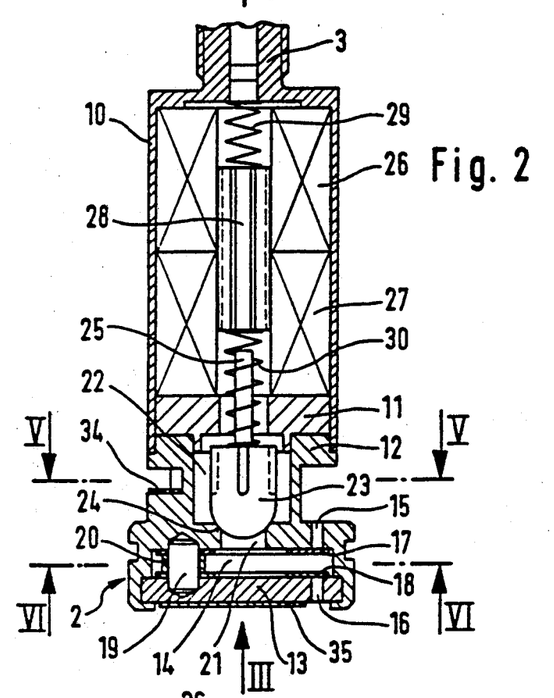
FIGS. 2 and 2A are axial sections through a first and second embodiment of this shock absorber respectively.

According to FIG. 2, the lower end of the piston rod 3 widens to form a cylindrical housing 10 which holds the piston 2. This essentially includes an upper plate part 11, in the form of an annular disc, arranged within the housing 10, a middle part 12 which adjoins the plate part 11 downwards in the drawing and which has a lower portion with a diameter larger than that of the housing 10, and is thus guided displaceably within the working cylinder 1, and a lower bottom part 13, the circular edge of which is sealingly surrounded by a clinched annular web on the middle part 12.

Formed between the bottom part 13 and a recess in the middle part 12 arranged eccentrically relative to the piston axis is a shallow chamber 14. The chamber 14 is connected to the chamber $1''$ of the working cylinder via an arcuate slot 16 in the bottom part 13 and to the chamber $1'$ of the working cylinder via similarly arcuate slot 15. Slot 15 leads to a clearance in the form of an annular step on the outside of the middle part 12. The slots 15 and 16 are assigned respective lamellar elastic plates 17 and 18 which are fastened in the chamber 14 at a distance from the slots 15 and 16 within the chamber 14 by means of a bolt 19 retained in mutually opposite blind bores in the bottom part 13 and in the middle part 12. This bolt 19 passes through corresponding bores of the plates 17 and 18 and moreover retains a spacer piece 20 which is arranged between the plate 17 and 18 in such a way that the plates 17 and 18 seek to lay themselves over the entire surface onto the upper and lower end faces of the chamber 14 formed by the middle part 12 and by the bottom part 13. At the same time, the plates 17 and 18 also seek to shut off the slots 15 and 16, specifically in such a manner as to prevent hydraulic medium from escaping from the chamber 14 into the chambers $1'$ or $1''$, but to allow a reverse direction of flow. Thus, plate valves corresponding to the non-return valves $P_1$ and $P_2$ of FIG. 1 are provided by means of the plates 17 and 18.

The plate 17 (the upper plate in FIG. 2) possesses, in the region of the piston axis, an orifice, to which is adjacent a central bore 21 in the middle part 12 of the piston 2. This bore 21 widens upwards in the form of an annular step into a valve chamber 22 in which a valve body 23 is arranged. This valve body 23 has a hemispherical end which confronts the central bore 21 and which interacts with a seat 24 formed by the annular step between the central bore 21 and the valve chamber 22. Located at the other end of the valve body 23 is a bar-shaped extension 25 which projects into the middle bore of the plate part 11.

This bore of the plate part 11 is continued into the inner space of two magnet coils 26 and 27 which are arranged axially in succession and which are accommodated within the housing 10.

These magnet coils 26 and 27 possess a common armature 28 which is in the form of a cylindrical bar and which is arranged between two helical compression springs 29 and 30 so as to be axially displaceable within the magnet coils 26 and 27. At the same time, the helical compression spring 29 (the upper spring in FIG. 2) is clamped between the upper end of the armature 28 and a stationary abutment formed in the housing 10. The helical compression spring 30 is arranged under elastic stress between the end of the armature 28 (the lower end in FIG. 2) and the valve body 23. Thus, the series arranged helical compression springs 29 and 30, with the armature 28 interposed, seek to urge the valve body 23 into its closing position, in which the central bore 21 is shut off from the valve chamber 22.

The valve body 23 and the armature 28 possess outer axial slots or axial channels, to guarantee that the pressure in the valve chamber 22 can propagate through the central bore of the plate part 11 as far as the stationary abutment of the spring 29. This guarantees that the hydraulic forces enacting on the armature 28 compensate one another.

Figure 4:
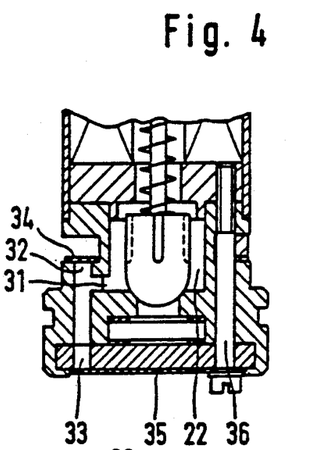
FIG. 4 is a cut-out axial section of the piston taken along the sectional line IV—IV in FIG. 3.
Figure 5:
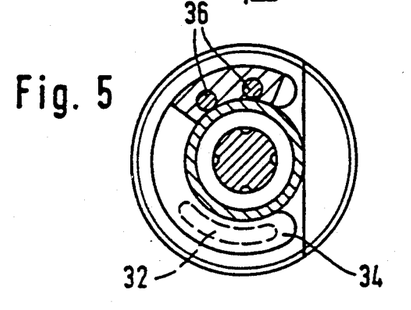
FIG. 5 is a radial section through the piston taken along the sectional line V—V in FIG. 2.
Figure 6:
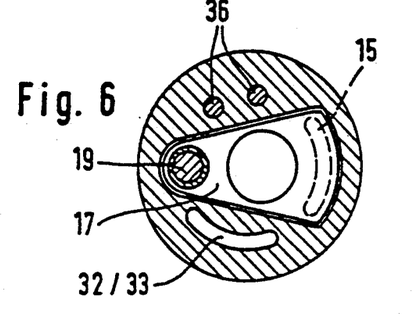
FIG. 6 is a radial section taken along the sectional line VI—VI in FIG. 2.

As shown in FIG. 4, the valve chamber 22 possesses laterally next to the seal 24 an eccentric widening 31, via which the valve chamber 22 communicates with slot-shaped orifices 32 and 33 on a step-shaped shoulder of the middle part 12 and on the underside of the bottom part 13 respectively. The said slot-shaped orifices 32 and 33 of arcuate shape (FIGS. 3, 5 and 6) are covered by lamellar elastic plates 34 and 35 which, as seen in the top view of FIGS. 4 and 5, each have a C-shaped form. These plates 34 and 35 are retained by means of screws 36 which pass through associated bores in the bottom part 13, in the middle part 12 and in the plate part 11.

The plates 34 and 35 constitute, together with the slot-shaped orifices 32 and 33, non-return valves which are designed as plate valves and which correspond to the valves $P_3$ and $P_4$ of FIG. 1 and allow a flow of hydraulic medium out of the valve chamber 22, but prevent a flow in the opposite direction.

The shock absorber illustrated via FIGS. 2 to 6 functions as follows:

When the piston 2 move downwards in relation to the working cylinder 1, hydraulic medium passes out of the chamber $1''$ via the slot 16 into the chamber 14, the plate 18 lifting off from the said slot 16 somewhat. The hydraulic medium then flows out of the chamber 14 into the valve chamber 22, the valve body 23 20 being lifted off from its seat 24. The hydraulic medium then passes from the valve chamber 22 via the widening 31 to the slot-shaped orifice 32, through which the hydraulic medium flows into the chamber $1'$ of the Working cylinder 1, the plate 34 assigned to the slot 32 being lifted off from the slot 32.

When the piston 2 moves in the opposite direction, that is to say upwards in relation to the working cylinder, hydraulic medium flows out of the chamber 1' of the working cylinder 1 through the slot 15, from which the plate 17 thereby lifts off, and into the chamber 14. From there, the hydraulic medium then passes into the valve chamber 22, and once again the valve body 23 is lifted off from its seat 24. The hydraulic medium then flows out of the valve chamber 22 further to the slot-shape orifice 33 and thereafter passes into the chamber 1'' of the working cylinder 1, the plate 35 lifting off from the slot-shaped orifice 33.

The said stroke movements of the piston 2 in the working cylinder 1 can take place only when there takes effect a minimum force which is sufficient to overcome the throttle resistances caused by the plates 17, 18, 33 and 34 and the valve body 23.

By selectively passing current through the magnet coil 26 or the magnet coil 27, the throttle resistance caused by the valve body 23 can be lowered or raised, for the live coil 26 seeks to lift the armature 28 upwards, while the live coil 27 seeks to push the armature 28 downwards in the drawing. The tension of the spring 30 is thereby either reduced or increased.

As long as the coils 26 and 27 are currentless, the throttle resistances to be overcome by the hydraulic medium during respective strokes of the piston 2 in the working cylinder 1 are determined solely by the spring characteristic of the helical compression springs 29 and 30 and of the plates 17, 18, 33 and 34. The dimensioning can be carried out such that a desired basic damping of the piston strokes occurs even when the coils 26 and 27 remain currentless.

Figure 2A:
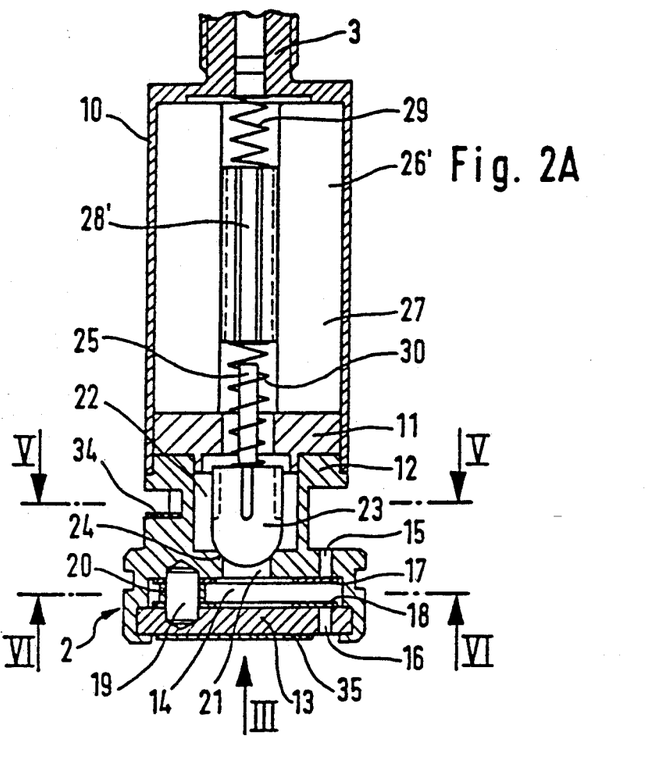
Figure 3:
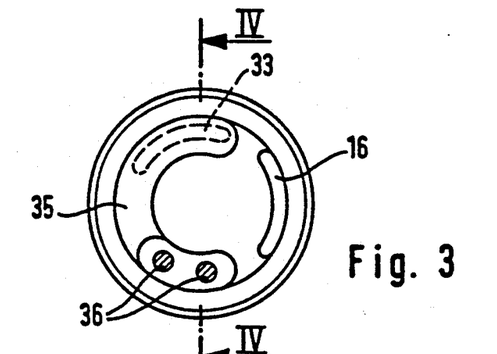
FIG. 3 is an end view according to the arrow III in FIG. 2.

In contrast to the embodiment illustrated, instead of the armature 28 consisting of magnetizable material (for example, iron), there is also the possibility of arranging a (permanently magnetized) bar magnet 28' and of replacing the two magnet coils 26 and 27, through which current can flow separately, by a single magnet coil 26' through which current can flow in mutually opposite directions (FIG. 2A). When current flows through this magnet coil 26' in one direction, the bar magnet 28' is then urged in one direction, while when current flows through this magnet coil in the other direction a force acts on the bar magnet in the opposite direction. In this way too, the closing force acting on the valve body 23 can be increased or reduced.

In all events, the armature 28 should be so arranged that it projects somewhat out of the magnet coil or the magnet coils 26 and 27 and forms with the respective coil a proportional magnet, the adjusting force of which depends virtually only on the intensity of the electrical current passing through the particular coil.

Furthermore, the valve body 23, the associated seat 24 and the spring 29 or 30 urging the valve body 23 into the closing position should be designed or calculated such that a valve with an approximately force-proportional opening behavior is formed. This guarantees that the throttle resistance of this valve in the direction of passage is very largely independent of the flow speed of the hydraulic medium passing through the valve and therefore very largely independent of the relative speed between the piston 2 and cylinder 1 as was shown with respect to FIG. 1.

Figure 7:
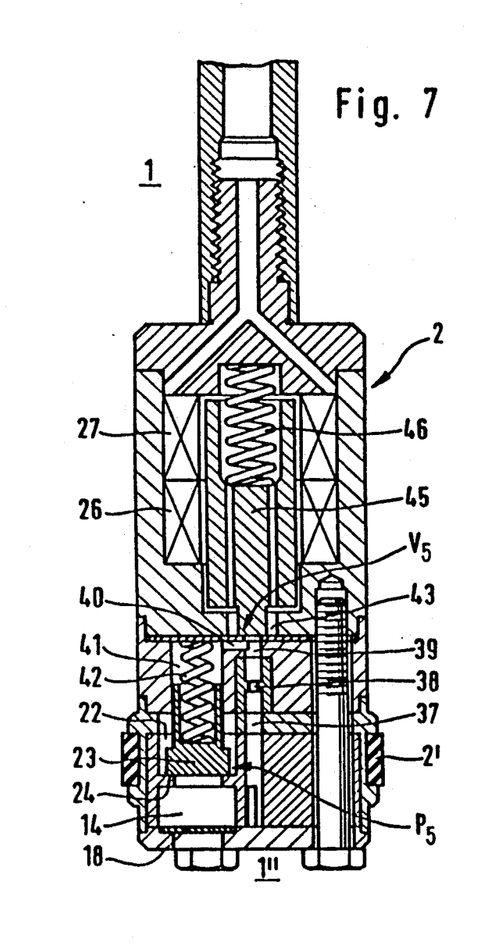
FIG. 7 is an axial section through a further embodiment in which the damping-control valve is actuated via a pilot control valve.
Figure 8:
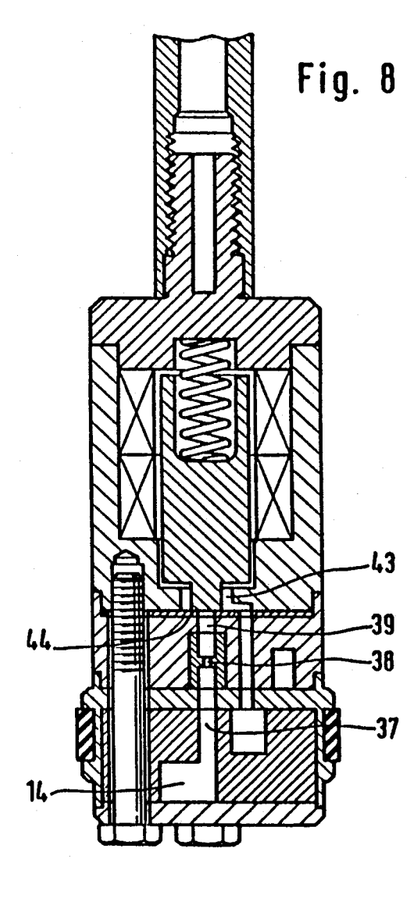
FIG. 8 is an axial section through a further embodiment in which the damping-control valve is actuated via a pilot control valve.
Figure 9:
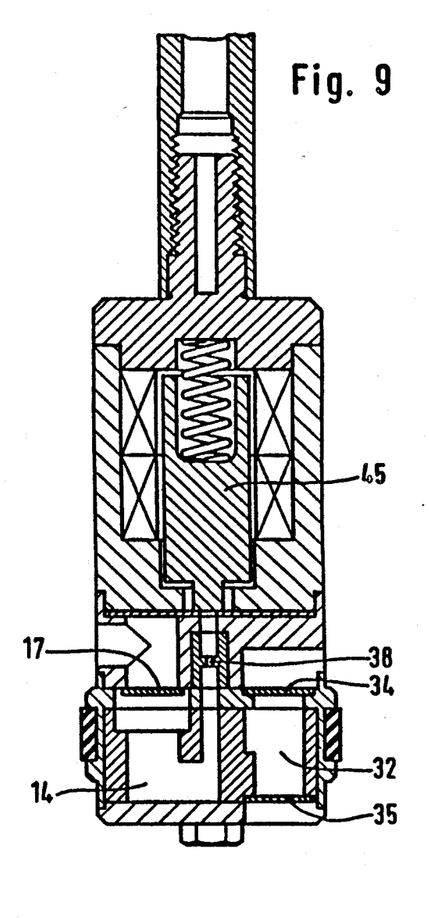
FIG. 9 is an axial section through a further embodiment in which the damping-control valve is actuated via a pilot control valve.

In the embodiment illustrated in FIGS. 7 to 9, the same reference symbols as in the previously described embodiment are used for elements corresponding to one another.

The essential difference between the embodiment described below and the embodiment described previously is that the damping-control valve $P_5$ is actuated via a pilot control valve $V_5$, the operating behavior of which can be varied by electromagnets, so that these can once again, albeit indirectly, influence the opening behavior of the damping-control valve $P_5$.

With its piston gasket 2', the piston 2 of FIGS. 7 to 9 divides two chambers 1' and 1'' (confer with FIG. 1) from one another within a working cylinder not shown. Formed once more in the lower region of the piston 2 is a chamber 14 which is closed off from the chamber 1'' by the plate 18 and from the chamber 1' by the plate 17, specifically in such a way that, when there is a sufficient pressure difference, hydraulic medium can in each case flow into the chamber 14, but a return flow in the opposite direction is prevented.

The chamber 14 is connected via a seat-controlled valve with the valve body 23 and with the associated seat 24 to a chamber 22. The chamber 22 itself communicates with a slot 32 which eccentrically passes axially through the lower piston region and which is itself closed off from the chambers 1' and 1'' of the working cylinder by means of spring plates 34 and 35. The spring plates 34 and 35 are so arranged as to form non-return valves which allow only a flow out of the slot-shaped space 32 into the chamber 1' or 1''.

The above-mentioned chamber 14 is connected to a central bore 37 which is connected to an inlet channel 39 of the pilot control valve $V_5$ via a throttle 38. At the same time, the inlet channel 39 is connected, on the one hand, via a recess 40 in the piston 2 to a pressure space 41 on the rear side of the valve body 23 of the damping-control valve $P_5$. The valve body 23 of the damping-control valve is guided sealingly and slidably in this pressure space 41 by means of a cylindrical extension arranged on it. Arranged in the pressure space 41 or in the inner space of the cylindrical extension of the valve body 23 is a valve spring 42 in the form of a helical compression spring which seeks to urge the valve body 23 into its closing position. The valve spring 42 is assisted in this by the hydraulic pressure prevailing in the pressure space 41.

The inlet channel 39 can be connected via the pilot control valve $V_5$ to an outlet space 43 which adjoins the inlet channel 39, thereby forming an annular step, itself interacting as a seat 44 with the valve body 45 of the pilot control valve $V_5$.

The outlet space 43 communicates via recesses in the piston with a slot-shaped space 32.

The valve body 45 of the pilot control valve $V_5$ possesses axial channels, in order to ensure that approximately the same hydraulic pressure prevails on the rear side of the valve body 45 as in the outlet space 43.

The valve body 45 is stressed against its seat 44 by a closing spring 46.

Moreover, the valve body 45 constitutes the armature of a proportional-magnet arrangement with one or preferably two magnet coils 26 and 27 which are so arranged that one coil, when live, increases the closing force of the valve body 45, while the other coil, when live, reduces the closing force of the valve body 45.

The embodiment last described functions as follows:

When the piston 2 moves downwards in relation to the working cylinder 1 (confer with FIG. 1), hydraulic medium flows out of the chamber 1' of the working cylinder 1 into the chamber 14 of the piston 2, the spring plate 18 moving to a greater or lesser extend out of its position sealing off the chamber 14 from the chamber 1".

The hydraulic medium then flows out of the chamber 14 by way of the central bore 37 and the throttle 38 to the inlet channel 39 of the pilot control valve P5 which opens under a more or less high pressure in the inlet channel 39, depending on the current passing through the coils 26 and 27. This opening pressure also prevails in the pressure space 41 and determines the closing force of the valve body 23 of the damping-control valve.

The valve body 23 then opens as soon as the hydraulic pressure in the chamber 14 can overcome the closing force of the valve spring 42 and the closing pressure of the hydraulic medium in the pressure space 41. Hydraulic medium consequently flows from the chamber 14 into the chamber 22 and from there into the slot-shaped space 32, into which also flows the hydraulic medium overflowing from the inlet channel 39 at the pilot control valve V5 to the outlet space 43. The hydraulic medium passes from the slot-shaped space 32 into the chamber 1" of the working cylinder 1, with the spring plate 34 thereby being opened.

When the piston 2 moves in the opposite direction, that is to say upwards in the drawing, in relation to the working cylinder 1, hydraulic medium flows out of the chamber 1' of the working cylinder 1 into the chamber 14, with the spring plate 17 being opened. The hydraulic medium then passes from there partly via the pilot control valve V5 and for the other greater part via the damping-control valve P5 in the previously described way into the slot-shaped space 32, from which it flows out into the chamber 1" of the working cylinder 1, with the spring plate 35 thereby being opened.

The stroke movements of the piston 2 in the working cylinder 1 can once again occur only when there takes effect a minimum force which is sufficient on the one hand to overcome the throttle resistances formed by the plates 18 and 34 or 17 and 35 and those formed by the valve body 23. This throttle resistance is determined by the operating state of the pilot control valve V5.

As long as the coils 26 and 27 remain currentless, the throttle resistances to be overcome by the hydraulic medium during respective strokes of the piston 2 in the working cylinder 1 are determined solely by the spring characteristic of the closing spring 46 of the pilot control valve V5 and of the valve spring 42 of the damping-control valve P5.

By passing current through one or the other of the coils 26 and 27, the hydraulic resistance counteracting the stroke of the piston 2 can then be raised or lowered in relation to the basic damping.

The embodiment last described is advantageous in as much as only a little power is needed for controlling the pilot control valve V5 that is to say the current consumption of the coils 26 and 27 is extremely low.

All the embodiments described are distinguished by the fact that the damping brought about by the damping-control valve P5 depends essentially only on the current intensity of the electrical current passing through the coils 26 and 27 and is approximately proportional to the current intensity. In contrast, the relative speed of the piston 2 and cylinder 1 has virtually no or no appreciable influence on the amount of damping brought about by the damping-control valve V5. The outlay for an automatic (computer-assisted) control of this damping resistance can thus be reduced substantially, and the electrical current intensity can be used as an actual-value signal for the damping resistance.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A controllable hydraulic shock absorber, comprising:
    a piston;
    first and second working chambers divided from one another via said piston;
    a damping-control valve arrangement connecting said first and second chambers for exchanging hydraulic medium during stroke movements of said piston, said damping-control valve arrangement including a closing member, controlled via an electromagnet arrangement, which, when stressed into a closing position via a spring element, opens an orifice cross-section, said damping-control valve arrangement depending on the pressure difference between said first and second working chambers and on the force of said electromagnet arrangement and including an armature arrangement located between said closing member and said spring element, said electromagnet arrangement being a proportional magnet such that the adjusting force depends substantially solely on the intensity of electrical current passing through said electromagnet arrangement;
    wherein a force proportional valve serves as said damping-control valve arrangement, the damping force being substantially independent of the piston stroke speed and wherein said armature arrangement is loaded in both a direction to strengthen and weaken the closing force of said closing member dependent upon the passage of current through said electromagnet arrangement; and
    wherein said spring element is dimensioned to provide an optimal basic damping for hard and weak damping conditions corresponding to that of a non-controllable hydraulic shock absorber when said electromagnet arrangement is inoperative.

2. Shock absorber according to claim 1, wherein two electromagnets are provided, the damping force being increased when current flows through one electromagnet and being weakened when current flows through the other electromagnet.

3. Shock absorber according to claim 2, wherein a bar-shaped armature is arranged displaceably within a central axial channel of two magnet coils which are arranged axially in succession and through which current can pass separately from one another.

4. Shock absorber according to claim 3, wherein said armature arrangement is arranged between a first and a second closing spring of the closing member in series with said first and second closing springs.

5. Shock absorber according to claim 3, wherein said damping-control valve is connected to non-return valves, in such a manner that both in the compression stage and in the extension stage of the shock absorber the exchange of hydraulic medium between the first and second working chambers takes place in the same direction of flow via the same damping-control valve.

6. Shock absorber according to claim 2, wherein said armature arrangement is arranged between a first and a second closing spring of the closing member in series with said first and second closing springs.

7. Shock absorber according to claim 2, wherein said damping-control valve is connected to non-return valves, in such a manner that both in the compression stage and in the extension stage of the shock absorber the exchange of hydraulic medium between the first and second working chambers takes place in the same direction of flow via the same damping-control valve.

8. Shock absorber according to claim 1, wherein said electromagnet arrangement controls the closing force of a pilot control valve, said pilot control valve controlling at least one of the closing pressure of said damping-control valve and the resistance counteracting an opening stroke of said damping-control valve.

9. Shock absorber according to claim 8, wherein two electromagnets are provided, the damping force being increased when current flows through one electromagnet and being weakened when current flows through the other electromagnet.

10. Shock absorber according to claim 8, wherein said armature arrangement is formed by a permanent magnet which interacts with a magnet coil through which current can pass in opposite directions, in such a manner that the damping force is increased or reduced depending on the direction of the electrical current.

11. Shock absorber according to claim 8, wherein said armature arrangement is arranged between a first and a second closed spring of the closing member in series with said first and second closing springs.

12. Shock absorber according to claim 8, wherein said damping-control valve is connected to non-return valves, in such a manner that both in the compression stage and in the extension stage of the shock absorber the exchange of hydraulic medium between the first and second working chambers takes place in the same direction of flow via the same damping-control valve.

13. Shock absorber according to claim 1, wherein said armature arrangement is formed by a permanent magnet which interacts with a magnet coil through which current can pass in opposite directions, in such a manner that the damping force is increased or reduced depending on the direction of the electrical current.

14. Shock absorber according to claim 13, wherein said armature arrangement is arranged between a first and a second closing spring of the closing member in series with said first and second closing springs.

15. Shock absorber according to claim 13, wherein said damping-control valve is connected to non-return valves, in such a manner that both in the compression stage and in the extension stage of the shock absorber the exchange of hydraulic medium between the first and second working chambers takes place in the same direction of flow via the same damping-control valve.

16. Shock absorber according to claim 1, wherein said armature arrangement is arranged between a first and a second closing spring of the closing member in series with said first and second closing springs.

17. Shock absorber according to claim 16, wherein said damping-control valve is connected to non-return valves, in such a manner that both in the compression stage and in the extension stage of the shock absorber the exchange of hydraulic medium between the first and second working chambers takes place in the same direction of flow via the same damping-control valve.

18. Shock absorber according to claim 1, wherein said damping-control valve is connected to non-return valves, in such a manner that both in the compression stage and in the extension stage of the shock absorber the exchange of hydraulic medium between the first and second working chambers takes place in the same direction of flow via the same damping-control valve.

19. Shock absorber according to claim 18, wherein the non-return valves are designed as plate valves.

* * * * *